United States Patent [11] 3,545,596

| [72] | Inventors | Harold L. Turnbough<br>Lemay;<br>Thomas J. Schuette, Webster Groves,<br>Missouri |
|---|---|---|
| [21] | Appl. No. | 729,197 |
| [22] | Filed | May 15, 1968 |
| [45] | Patented | Dec. 8, 1970 |
| [73] | Assignee | Alvey, Inc.<br>St. Louis, Missouri<br>a corporation of Missouri |

[54] CONVEYOR
10 Claims, 12 Drawing Figs.

[52] U.S. Cl. .................................................. 198/129,
198/160
[51] Int. Cl. ...................................................... B65g 15/00
[50] Field of Search ........................................... 198/160,
19, 168, 129

[56] References Cited
UNITED STATES PATENTS

| 1,856,733 | 5/1932 | Shepherd ..................... | 198/19 |
|---|---|---|---|
| 2,353,474 | 7/1944 | Kiehn ........................... | 198/168 |

Primary Examiner—Richard E. Aegerter
Assistant Examiner—Douglas D. Watts
Attorney—Gravely, Lieder & Woodruff ABSTRACT: A conveyor including a load-supporting bed and a draw chain having floating pads resiliently mounted thereon. The pads engage the undersurfaces of loads on the bed and draw them along the bed when such loads are not obstructed. When a load encounters an impediment, the pads depress or yield and pass beneath the load without damaging it.

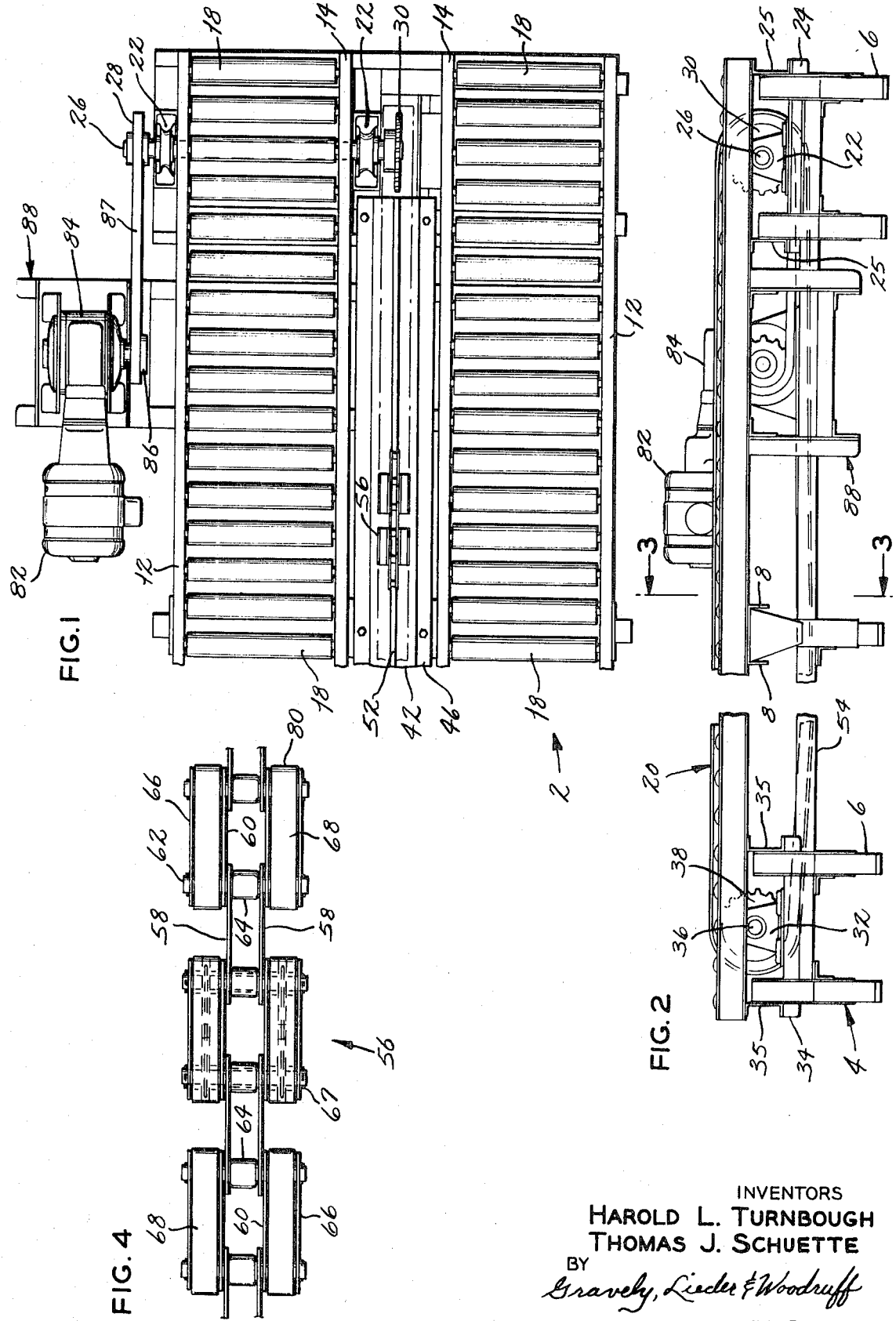

INVENTORS
HAROLD L. TURNBOUGH
THOMAS J. SCHUETTE
BY
Gravely, Lieder & Woodruff
ATTORNEYS

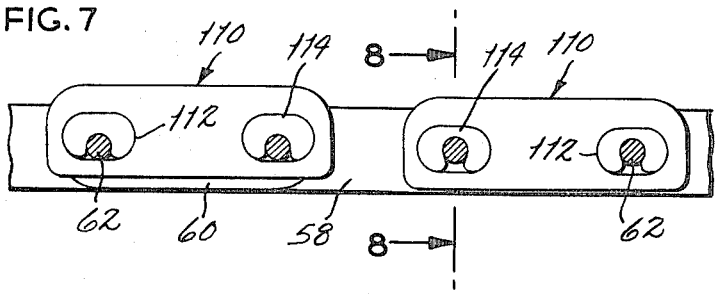
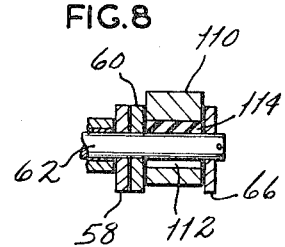
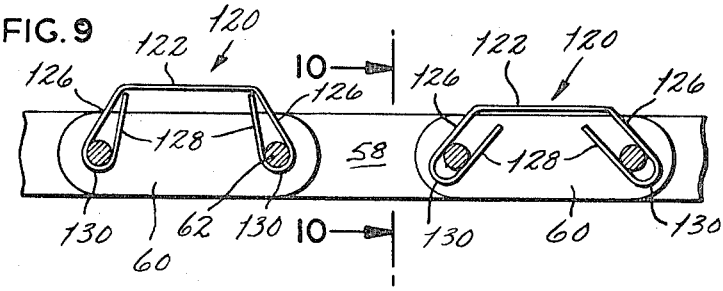
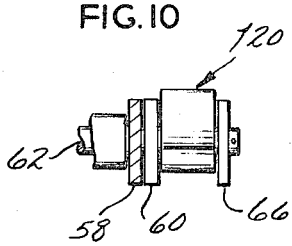
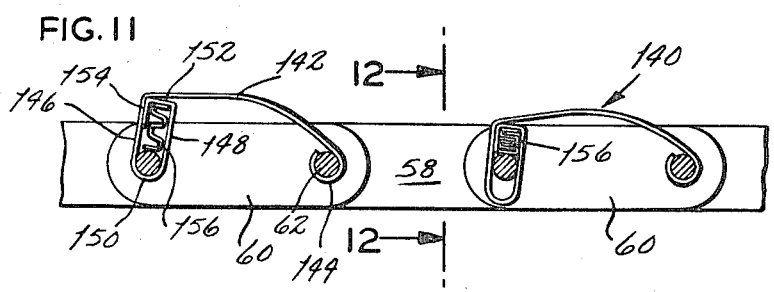
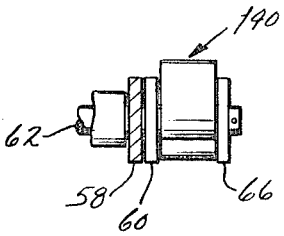

3,545,596

1
CONVEYOR

This invention relates in general to conveyors and more particularly to a conveyor in which the conveyed load is moved along a supporting structure by a drag chain.

Heretofore, drag chains have been utilized to move loads such as cartons, pallets, packages and the like along roller beds, slide ways, and other types of supporting structures. These chains are generally provided with some sort of upstanding elements which engage the loads so that the loads move along the conveyor at the same velocity as the chain. This means of conveyance is entirely satisfactory as long as all the loads are free to move along the supporting structure with the chain. However, when one or more of the loads encounters an impediment such as a stop or an an accumulation of preceding loads, the chain, if it continues to run, will pass beneath the loads with the upstanding elements intermittently lifting or otherwise jarring the loads. These elements in time wear and damage the stalled loads, and in the event of an accumulation of stalled loads, excessive pressures build up between the loads which can result in considerable damage if the loads are of a fragile nature. Furthermore, considerable power is consumed just dragging the upstanding elements beneath the stalled loads. On the other hand, the drag chain may be stopped when one of the loads encounters an impediment, but this imposes the stains of excessive stops and starts on the drive train, and the frequent starts furthermore consume excessive power.

One of the principal objects of the present invention is to provide a draw chain conveyor for moving loads without damaging the loads when one of them encounters an impediment. Another object is to provide a conveyor having the capabilities of transporting loads as well as accumulating them back to back with low pressure between the loads in the latter event. Another object is to provide a conveyor which is adaptable to varying types of loads. A further object is to provide a drag chain conveyor which requires nominal power to transport loads from its one end to the other. Still another object is to provide a drag chain conveyor which is rugged in construction and economical to manufacture.

These and other objects and advantages will become apparent hereinafter.

The present invention is embodied in a conveyor including a load-carrying bed and a draw chain provided with a plurality of outwardly biased floating drag links or pads. A portion of the chain's periphery moves slightly below the upper or load-carrying surface of the bed so that the drag links on it project upwardly and frictionally engage whatever load may be above them on the load carrying bed, thereby imparting movement to the load in the direction of the chain.

The invention also consists in the parts and in the arrangements and combinations of parts hereinafter described and claimed. In the accompanying drawings which form part of the specification and wherein like numerals and letters refer to like parts wherever they occur:

FIG. 1 is a fragmentary plan view of a conveyor constructed in accordance with and embodying the present invention;

FIG. 2 is a fragmentary elevational view of the conveyor;

FIG. 4 is a plan view of the draw chain forming part of the present invention;

FIG. 7 is an elevational view of another modified floating pad;

FIG. 8 is a sectional view taken along line 8–8 of FIG. 7;

FIG. 9 is an elevational view of a further modified floating pad;

FIG. 10 is a sectional view taken along line 10–10 of FIG. 9;

FIG. 11 is an elevational view of still another modified floating pad; and

FIG. 12 is a sectional view taken along line 12–12 of FIG. 11.

2

Figure 3:
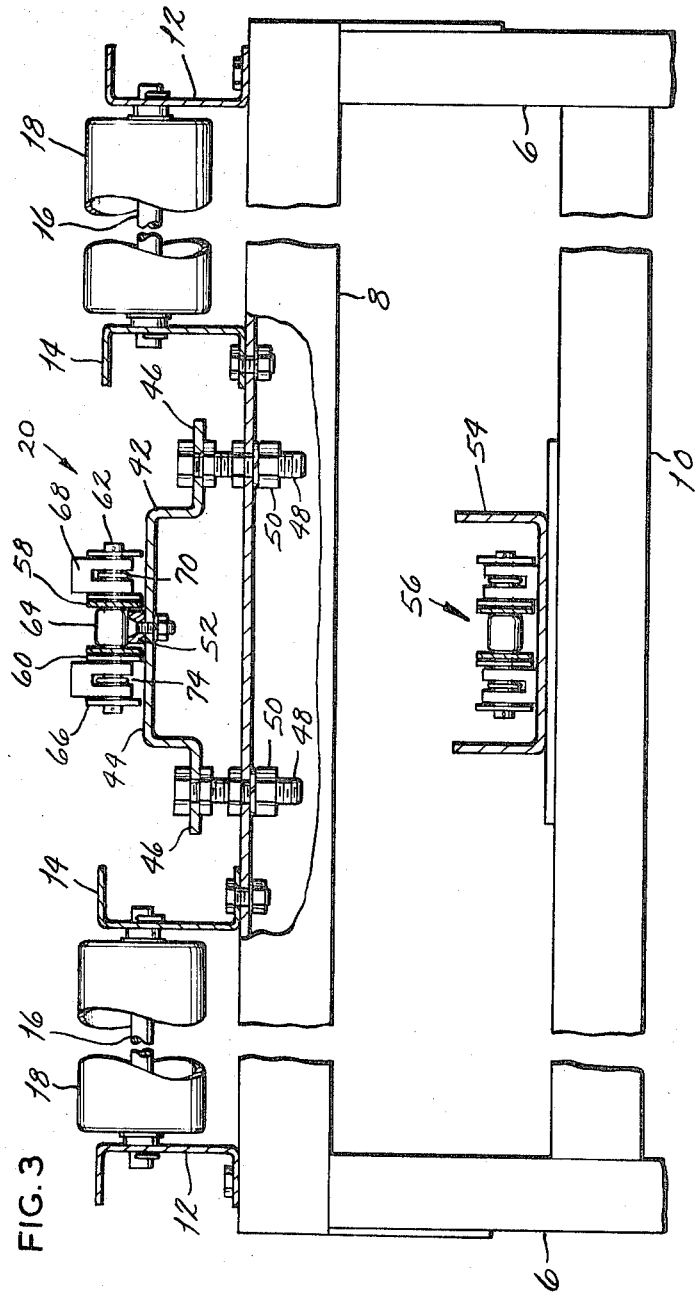
FIG. 3 is a fragmentary sectional view taken along line 3–3 of FIG. 2.

Referring now to the drawings in detail, 2 designates a conveyor including a frame 4 having a plurality of upstanding legs 6 arranged in pairs, the legs 6 of each pair being connected by upper cross angles 8 and lower cross angles 10. Bolted to the horizontal flanges of the upper cross angles 8 are outer channel members 12 and inner channel members 14, the former of which are disposed at the upper ends of the legs 6, while the latter are spaced somewhat inwardly in parallel relation thereto. Each channel member 12 and 14 is, moreover, presented with its web oriented vertically, and transversely connecting the webs of each set of inner and outer channel members 12 and 14 are a plurality of axles 16. Journaled for free rotation on the axles 16 are rollers 18, the cylindrical surfaces of which project above the upper flanges of the channel members 12 and 14 in the formation of a load-supporting bed or surface.

The frame 4 further carries a draw chain assembly 20 including a pair of axially aligned pillow blocks 22 bolted to longitudinally extending angles 24 which are attached to a pair of cross channels 25 located adjacent to the two endmost legs 6 and secured in turn to the undersides of the channel members 12 and 14. Journaled in the pillow blocks 22 is a drive shaft 26 having an outer driven sprocket 28 keyed to its outwardly presented end and an inner drive sprocket 30 keyed to its innermost end, the latter being disposed midway between the inner channel members 14. At its opposite end the frame 4 carries a somewhat similar structure which also forms part of the draw chain assembly 20 and includes a pair of closely spaced pillow blocks 32 mounted on longitudinally extending angles 34 which in turn are secured to a pair of similar cross channel 35 located adjacent to the two endmost lower cross angles 10 at that end of the frame 4. Journaled within the pillow blocks 32 is an idler shaft 36 having an idler sprocket 38 mounted on it midway between the inner channels 14 and in alignment with the drive sprocket 30. As will be subsequently more apparent, it is desirable to provide means for varying the distance between the pillow blocks 22, 32, and such means can take the form of multiple longitudinally spaced bolt holes in the longitudinally extending angles 34.

The draw chain assembly 20, as illustrated in FIGS. 1 and 3, further includes an inverted channel member 42 having a horizontal web portion 44 and a pair of outwardly projecting mounting flanges 46 which are secured to the horizontal flanges of the upper cross angles 8 by means of mounting bolts 48 and adjusting nuts 50. The channel member 42 extends substantially the entire distance between the sprockets 30 and 38, and as will be seen by reference to FIG. 3, the height of the inverted channel member 42 above the upper cross angles 8 can be precisely adjusted by manipulating the adjusting nuts 50. Bolted against the upper surface of the web portion 44 is a chain rail 52 which terminates adjacent to and aligns with the sprockets 30 and 38. Extending across the lower cross angles 10 directly below the chain support member 40 and sprockets 22 and 32 is an upwardly opening chain return channel 54.

Trained over the drive sprocket 30 and the idler sprocket 38 is a draw chain 56 (FIG. 4) including pairs of alternate inner links 58 and outer links 60 which are interconnected at their ends by connecting pins 62. The space separating each pair of inner links 58 is slightly greater than the width of the chain rail 52, and journaled on the connecting pins 62 within this space are chain rollers 64, each of which rides upon the upper surface of the chain rail 52. Accordingly, that portion of the chain 56 passing over the channel member 42 will be maintained at a predetermined height with respect to the rollers 18 by the chain rail 52 and, moreover, cannot be displaced laterally off of the chain rail 52, since the inner links 58 project below the chain rollers 64 where they engage the side faces of the chain rail 52, all as best seen in FIG. 3.

Figure 5:
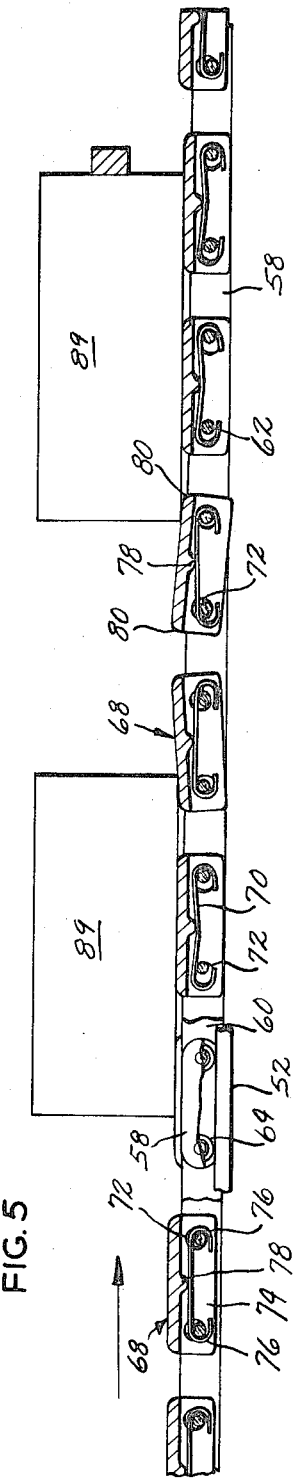
FIG. 5 is an elevational view of the draw chain showing the floating pads in section and in engagement with loads.

Each connecting pin 62 projects laterally beyond the outer links 60 and spanning pins 62 in outwardly spaced relation to the outer links 60 are side links 66 which are maintained in place by small cotter pins 67. Fitted over the laterally projecting portions of the connecting pins 62 intermediate the side links 66 and outer links 60 are floating drag links or pads 68 which are biased outwardly or caused to rise above the plane of the rollers 18 by means of springs 70. More specifically, as illustrated in FIG. 5, each pad 68 is provided with a pair of transversely extending bores 72 which receive but are diametrally larger than the laterally projecting portions of the pins 62. Consequently, each pad 68 is free for limited shifting movement, upwardly and downwardly as well as longitudinally between the links 60 and 65, which laterally confine it. The spring 70 for each pad 68 is housed (FIG. 3) within a longitudinally extending inwardly opening groove 74 within that pad 68 and terminates at hooked end portions 76 which loop around the laterally extending portions of the pins 62 on which that particular pad 68 is mounted.

As is shown in FIG. 5, each pad 68 is free to rock relative to its spring 70 so that as a load is engaged, the pad can rock to a position where it will easily pass under the load and, if not impeded, the load will be dragged along by the pad. The rocking of the pad is achieved by having the center portion of each spring 70 between its hooked end portions 76 engaged by a boss 78 formed integral with the particular pad 68 and protruding inwardly into its groove 74 so that the spring 70 is deformed inwardly intermediate of its ends. The boss 78, of course, may be on the spring instead of on the pad. Accordingly, the spring 70 biases the floating pad 68 outwardly, until the connecting pins 62 engage the lower surfaces of the bores 72, the biasing force exerted being dependent on the size and composition of the spring material. Moreover, since the boss 78 of each pad 68 engages its corresponding spring 70 at the approximate midpoint of that spring, the pads 68 are free for limited tilting movement about their bosses 78 as well as on either of their leading or trailing pins 62.

The upper ends of each pad 68 are rounded off in the provision of contoured leading and trailing edges 80. It should be noted that the height of pads 68, the size and location of bores 72, and distance between the connecting pins 62 and the upper surfaces of rollers 18 on that portion of the draw chain 56 passing over chain support member 40 are all such that when unobstructed the pads 68 will project upwardly beyond the plane of the upper surfaces of the rollers 18 as illustrated in FIG. 3.

The outer driven sprocket 28 is connected to a suitable drive motor 82 through an angled gear reduction transmission 84, a drive sprocket 86, and a connecting chain 87. Both the drive motor 82 and the transmission 84 are mounted on a supporting framework 88 which in turn is secured to the frame 4. When the drive motor 82 is energized, the drive sprocket 86 rotates, and this rotation is transmitted to the driven sprocket 28 through the chain 87. Inasmuch as the drive sprocket 30 is connected to the driven sprocket 28 through the drive shaft 26, it too will rotate, causing the draw chain 56 to advance along the chain rail 52 and return through the chain return channel 54.

In use, loads 89 such as cartons are placed or otherwise directed upon the rollers 18 at the end of conveyor 2 where the draw chain 56 leaves the chain return channel 54. This can be either end of the conveyor 2 depending on the direction in which the chain 56 is traveling across the chain support member 40. In any event, as a load 89 is lowered onto the rollers 18, it will engage and depress those floating pads 68 immediately beneath it, and since the pads 68 are biased upwardly when over the chain support member 40, a good frictional contact will be established between the upper surface of the pads 68 and the undersurface of the load 89. Consequently, the load 89 will be drawn across the supporting bed defined by the rollers 18 with the rollers 18 immediately beneath the load 89 at any given instance revolving to reduce frictional resistance acting against the movement to an absolute minimum. If for some reason an impediment should be encountered such as a stop or an accumulation of other loads 89 at the opposite end of the conveyor 2, the pads 68 will merely pass beneath the blocked load 89, depressing as they traverse the undersides of that load as best seen in FIG. 5. In particular, as an upwardly projecting unloaded pad 68 approaches a stalled load 89, its contoured leading edge 80 will engage the trailing lower edge of that load 89 and in so doing will cam the leading end of the pad 68 slightly rearwardly and downwardly beneath the stalled load 89, while its trailing end pivots about the trailing pin 62. Since the end portions 76 of the spring 70 are merely hooked over the pins 62 and extend somewhat beyond them, the spring 70 also experiences limited longitudinal movement. Upon further advancement of the pad 68, its trailing end will be urged downwardly beneath the stalled load 89. Since the pad 68 at this point is free to tilt about its boss 68, it can adapt itself to irregularities on the undersurface of load 89. Accordingly, the pads 68 will pass across the underside of the load 89 without tearing, jarring, or otherwise damaging it or its contents.

Moreover, as the pads 68 pass under the load 89, excessive power is not consumed. Clearly, it is not necessary to stop the drag chain 56 when a load 89 becomes stalled on the conveyor 2 as is the case with many conventional conveyors. Consequently, the excessive power consumption and equipment overloads encountered upon resumption of operation are eliminated. Also, a number of loads 89 can accumulate back to back on conveyor 2 with only very low pressures developing between such loads.

It should be noted that the longitudinally directed force applied to the loads 89 by reason of the frictional engagement between the pads 68 and the undersurfaces of the loads 86 can be varied by lowering or raising the chain support member 40 through manipulation of the adjusting nuts 50. The same end can be achieved to a limited extent by using weaker or stronger springs 70 or by changing the material from which pads 68 are formed. In this connection, it is preferable to form the pads 68 from regular steel, stainless steel, aluminum, nylon, teflon, or various fibered substances.

Figure 6:
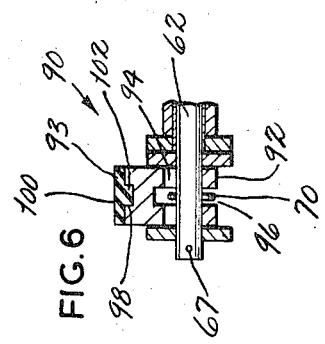
FIG. 6 is a sectional view of a modified floating pad.

As will be seen by reference to FIG. 6, it is possible to provide a modified floating pad 90 which possesses an external configuration identical to that of pad 68. The pad 90, however, includes a base 92 preferably formed from a suitable metal or other rigid substance, and a friction insert 93 formed from some other substance such as rubber or a synthetic resin composition. More specifically, the former possesses transversely extending bores 94 for reception of the laterally projecting portions of the connecting pins 62 and an inwardly opening groove 96 within which the spring 70 is contained. Across its top surface the pad 90 is provided with a longitudinally extending groove 98. The insert 93 has an upwardly presented friction surface 100 which is beveled off at its leading and trailing ends and is further provided with a depending rib 102 sized for snug fitting insertion into the groove 98. The rib 102 and the remaining undersurface of insert 93 are adhesively secured to the upper surface of the base 92.

Referring now to FIGS. 7 and 8, it is possible to provide another modified floating pad 110 also for use on the draw chain 56. The pad 110, possesses an external configuration identical to that of pad 68. However, in lieu of the transversely extending bores 72, the pad 110 is provided with a pair of transversely extending elongated cavities 112 having inverted U-shaped bushings 114 fitted therein. The bushings 114 are preferably formed from soft rubber or some other suitable elastomeric substance and more or less embrace the laterally projecting portions of the connecting pins 62.

When floating pad 110 is unloaded, the bushings 114 urge it outwardly, causing the pins 62 to bear against the lower surfaces of the cavities 112. On the other hand, when the pad 110 is subjected to loads, pins 62 will be forced further into bushings 114 thereby compressing the latter and causing them to flow somewhat around the pins 62. Accordingly, the pads 110, like the pads 68, float on the connecting pins 62. The elongated configuration of the cavities 112 prevents the bushings 114 from rotating therein, or in other words, keeps them properly oriented with respect to connecting pins 62.

Turning now to FIGS. 9 and 10, it is possible to provide still another modified floating pad 120 formed from a spring steel band and having a substantially flat center section 122, the outer surface of which is adapted to engage the underside of the load 89 or any other load on the conveyor 2. The center section 122 integrally merges at its ends into a pair of diverging outer legs 126 which are inclined at an oblique angle with respect to the center section 122 and are connected to inner legs 128 through arcuate bight segments 130. Not only do the bight portions 130 conform to the curvature of the pins 62, but the curvature of each bight portion 130 is such that when unrestrained the legs 126 and 128 will converge. When the pads 120 are unloaded, the bight segments 130 will extend around the pins 62 and the legs 126 and 128 will converge beyond them as shown at the left in FIG. 9. Moreover, the center section 122 will be presented outwardly for frictional engagement with loads 89.

However, when the center portion 122 engages a load and is thereby depressed, the outer legs 126 will be spread so that the angle of convergence between them is even greater, while at the same time the pins 62 ride along the inwardly presented faces of the legs 126 and 128, thereby causing the legs 126 and 128 to spread in opposition to their natural bias. Therefore, to depress the pad 120, the load must overcome two biasing effects acting in combination, namely the natural tendency of the outer legs 126 to assume substantially the angle of convergence they have when unrestrained, and the natural tendency of the legs 126 and 128 to more fully embrace the pins 62, that is, to squeeze inwardly and assume the position in which they converge. Consequently, the pad 120 floats with respect to the pins 62 and the remaining components of the draw chain 56.

As will be seen by reference to FIGS. 11 and 12, it is possible to provide an additional modified form of floating pad 140 which is also preferably formed from a band of spring steel. Like the foregoing pads 68, 90, 110 and 120, each pad 140 is interposed between a set of the outer links 60 and side links 66. The pad 140 includes an arcuate load-engaging center section 142, the upper surface of which normally projects above the remaining components of the draw chain 56 for frictional engagement with the underside of a load. At its forward end the center section 142 merges into a looped forward end portion 144 which extends around a substantial portion of the cylindrical surface on the laterally projecting portion of the leading connecting pin 62, so that the pad 140 is swingably mounted on that pin 62. At its rear end the center section 142 abruptly merges into an outer leg 146, which is in turn connected to an inner leg 148 through an arcuate bight segment 150. At its opposite end the inner leg 148 merges into an end leg 152, which in turn carries an abutment leg 154, the latter of which abuts against the inwardly presented surface of the outer leg 146, in the formation of a complete encirclement of the laterally projecting portion of the trailing connecting pin 62. Interposed between the end leg 152 and the encircled portion of the trailing pin 62 is coiled spring 156 having rectangular convolutions which substantially fill the void between the legs 146 and 148 so that the spring 156 thereby remains in place. The spring 156 urges the end leg 152 and with it the center section 142 away from the trailing connecting pin 62.

When no load acts upon the floating pad 140, its center section 142 will be presented above the remaining components of the draw chain 56 as well as above the upper surfaces of the rollers 18. Also, the arcuate bight segment 150 will bear against the underside of the trailing pin 62 so that the spring 156 is always maintained under compression. When the carton 89 or any other load is placed on the conveyor 2 provided with the floating pads 140, the center section 142 will be depressed, carrying along with it the guide portion 145. As the guide portion 145 depresses the spring 156 compresses even further and urges the center section 142 up into frictional engagement with the underside of the load.

It should be noted that the floating pads 68, 90, 110, 120 and 140 each have curved or contoured leading edges so that when a stalled load 89 or other load is encountered, the particular pad will merely cam itself beneath the stalled load without damaging it or causing drive motor 82 to consume excessive power.

This invention is intended to cover all changes and modifications of the examples of the invention herein chosen for purposes of the disclosure which do not constitute departures from the spirit and scope of the invention.

We claim:

1. In a conveyor having a load-supporting bed defining a plane of movement, propelling means for moving the loads along the bed, said propelling means comprising elongated draw means moveable with respect to the bed, pins mounted on and extending transversely of the draw means at longitudinally spaced intervals thereon, load-engaging pads carried by the draw means for frictionally engaging the loads and for moving the loads along the bed, each pad being mounted on and spanning two different pins, each pad being bodily shiftable with respect to the draw means at both pins on which it is mounted and further being shiftable in a vertical direction relative to the load supporting bed and draw means at at least one of the pins on which it is mounted, and resilient means carried by the draw means for urging portions of the pads to a position normally beyond the plane of movement on the load supporting bed so that the pads will frictionally engage loads supported on the bed, the leading ends of the pads being configured to cam the pads downwardly in opposition to the resilient means upon encountering a load which is prevented from moving along the bed so that the pads will slide beneath blocked loads.

2. A structure according to claim 1 wherein each pad is shiftable in a vertical direction relative to the load supporting bed and draw means at both pins on which it is mounted.

3. A structure according to claim 2 wherein both ends on each pad are configured to cam the pads downwardly in opposition to the resilient means upon encountering a blocked load, whereby the draw means can operate in either direction.

4. A structure according to claim 2 wherein the force exerted by the resilient means on each pad is concentrated between the pins on which the pad is mounted.

5. The structure according to claim 1 wherein each pad has transversely extending bores which loosely receive the pins so that the pads can shift with respect to the pins, wherein the resilient means is a resilient elongated element engaging the pins at its ends, and wherein the pad is provided with a proturberance which engages the resilient elongated element intermediate the pins and is positioned with respect to the bores such that when the pad is moved out of its normal position the pad is free for limited tilting movement about the point of contact between the protuberance and elongated element.

6. The structure according to claim 5 wherein the leading edge of each pad is curved so that when the pad encounters a stalled load the curved surface will cam the pad beneath the load.

7. The structure according to claim 1 wherein each pad has transversely extending bores which loosely receive the pins so that the pads can shift with respect to the pins, wherein the resilient means are elastomeric elements fitted into the bores, wherein the pins extend across the elastomeric elements, and wherein the elastomeric elements are disposed in the bores so that the pins sink into them when the pad is displaced from its normal position.

8. In a conveyor for moving a plurality of loads along a load-supporting bed defining a plane of movement for the loads, propelling means adjacent to said load supporting bed to propel the loads along the bed, said propelling means comprising an elongated draw member movable with respect to the bed and having pins extending laterally of the direction of movement and load engaging pads connected to the draw member at spaced intervals each pad comprising a center section normally presented above the plane of movement for engagement with the load, first legs resiliently connected to the center section, second legs normally converging with respect to the first legs and a bight portion resiliently interconnecting the first and second legs, the bight portion extending partially around the pins and the first and second legs converging beyond the pins when the pad is in its normal position, whereby when the center section is shifted toward the plane of movement the angle of the first legs with respect to the center section will change and the angle between the normally converging first and second legs will change so that the center section is biased to its normal position.

9. The structure according to claim 1 wherein each pad comprises a center section normally presented above the plane of movement for engaging the load, a first end portion extending substantially around the leading pin so that the pad is swingably mounted on the leading pin, and a second end portion forming an elongated loop around the trailing pin for permitting upwardly and downwardly shifting movement of the center section, and wherein a spring is contained within the second end portion for urging the pad toward its normal position.

10. The structure according to claim 1 wherein each pad comprises a blocklike body portion having transversely extending bores for loosely receiving the pins so that the pads can shift with respect to the pins, and an insert secured to the body portion and formed from material different than that from which the body portion is formed, at least a portion of the insert being presented above the plane of movement when the pads are in their normal position.